(No Model.)
F. A. BISHOP.
SHIP'S LOG.
No. 512,269.
Patented Jan. 9, 1894.
5 Sheets—Sheet 2.
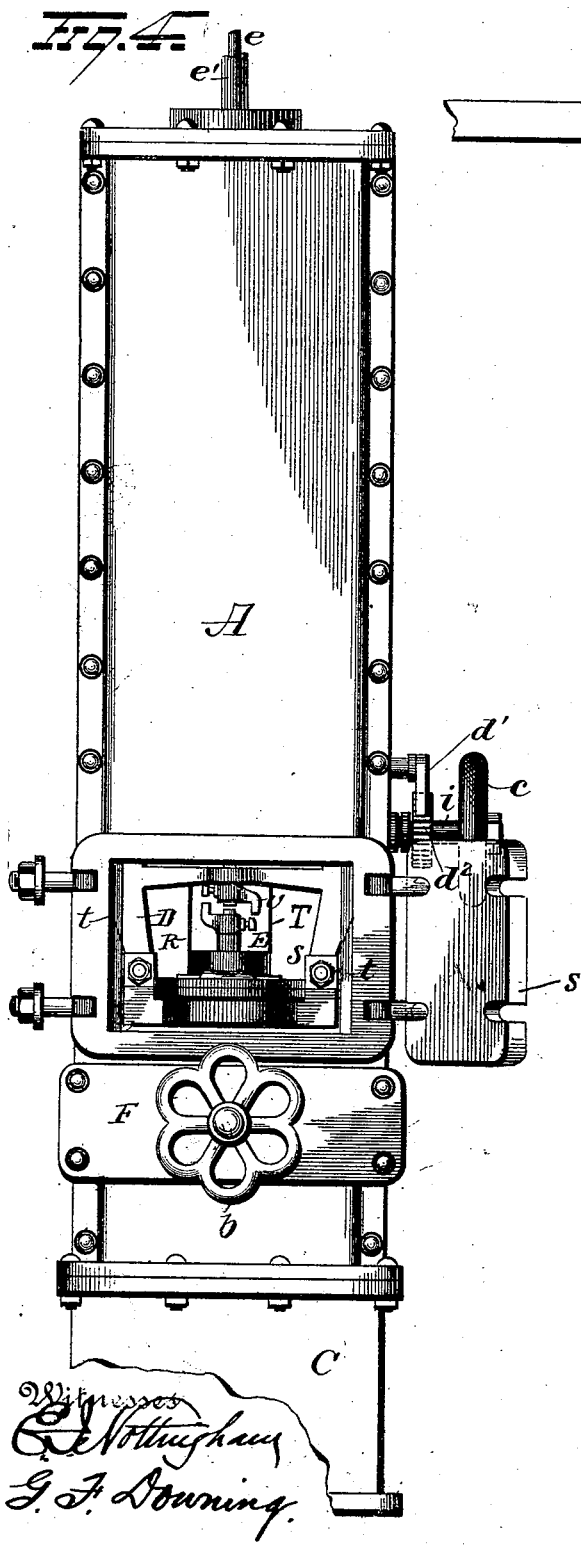
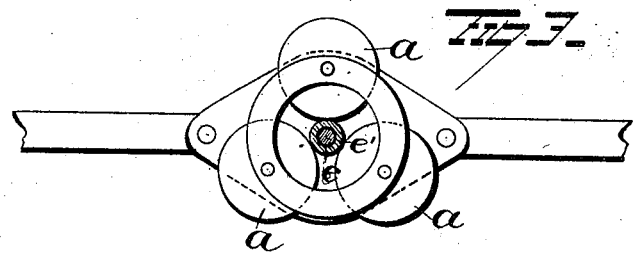
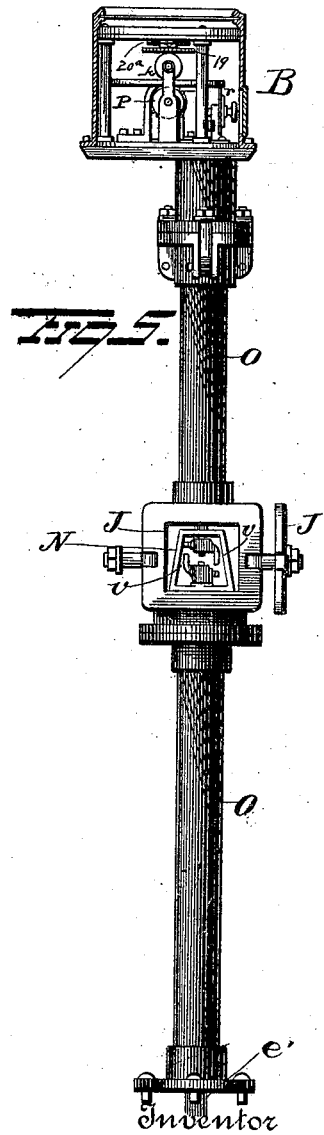
Witnesses
E. Nottingham
G. F. Downing
Inventor
F. A. Bishop
By F. A. Symons
Attorney (No Model.) 5 Sheets—Sheet 3.
F. A. BISHOP.
SHIP'S LOG.
No. 512,269. Patented Jan. 9, 1894.
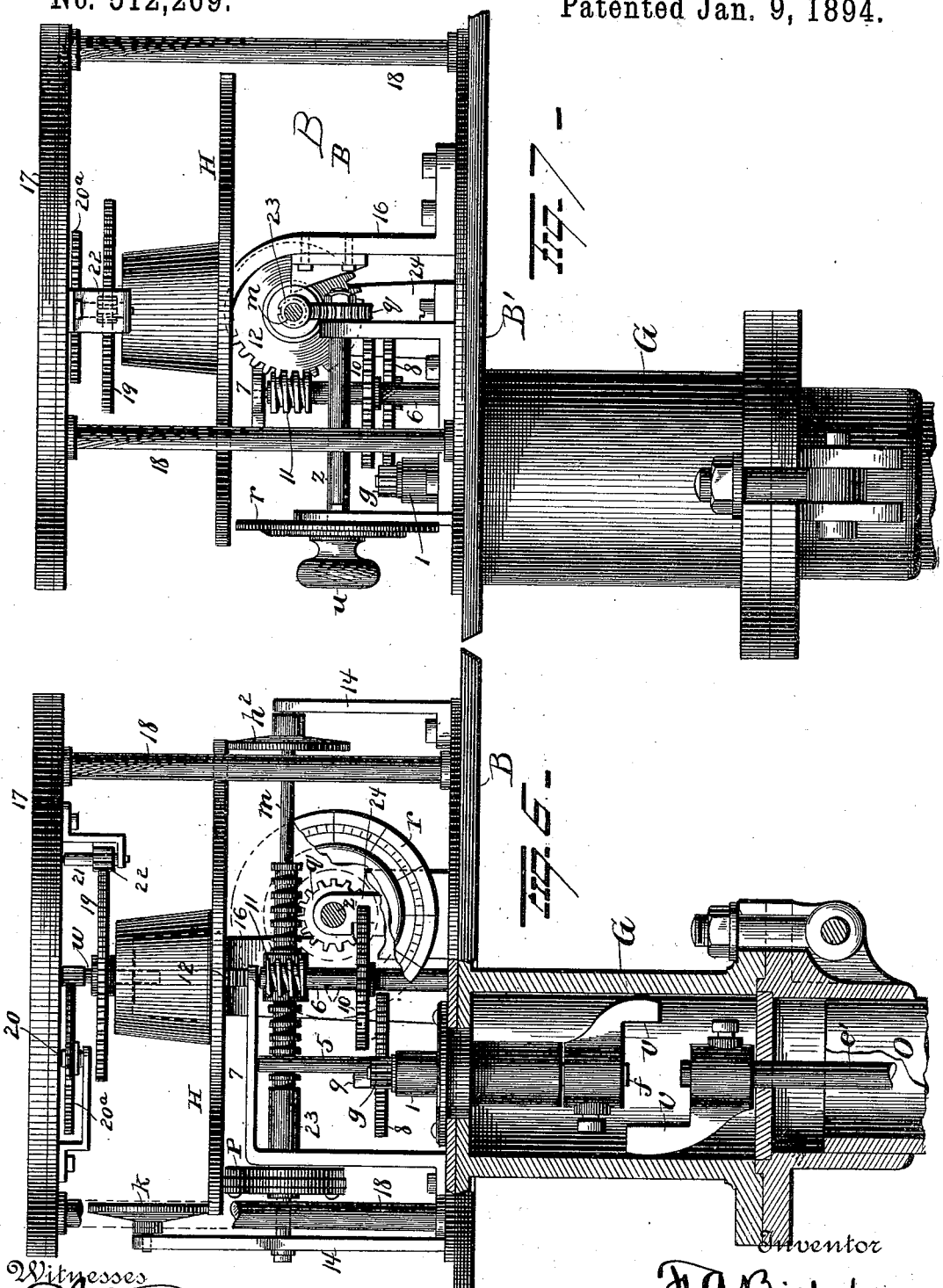
Witnesses
E. I. Nottingham
G. F. Downing
Inventor
F. A. Bishop.
By H. A. Seymour.
Attorney (No Model.) 5 Sheets—Sheet 4.
F. A. BISHOP.
SHIP'S LOG.
No. 512,269. Patented Jan. 9, 1894.
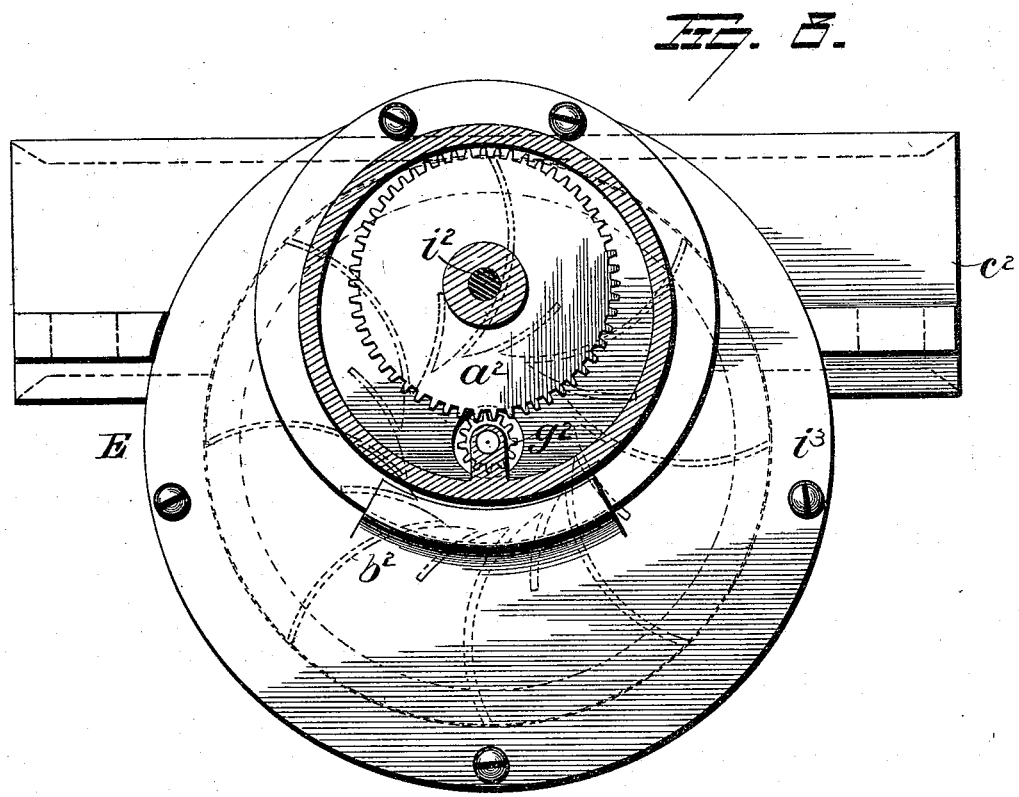
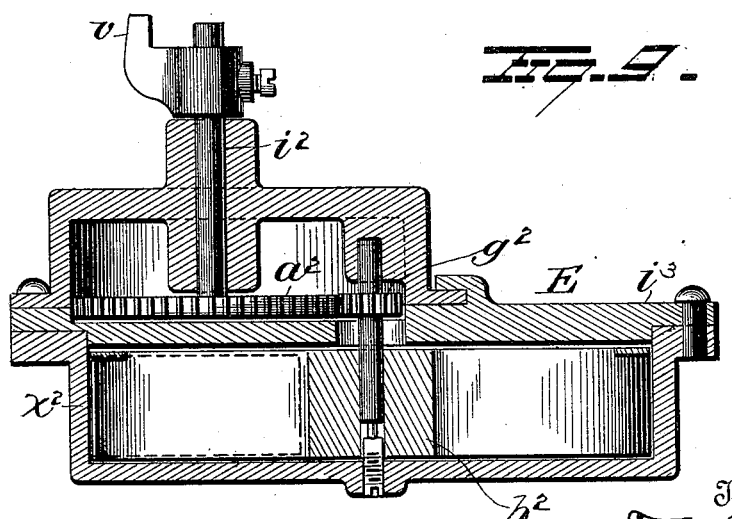
Witnesses
E. Nottingham
G. F. Downing
Inventor
F. A. Bishop
By H. A. Symons
Attorney (No Model.)

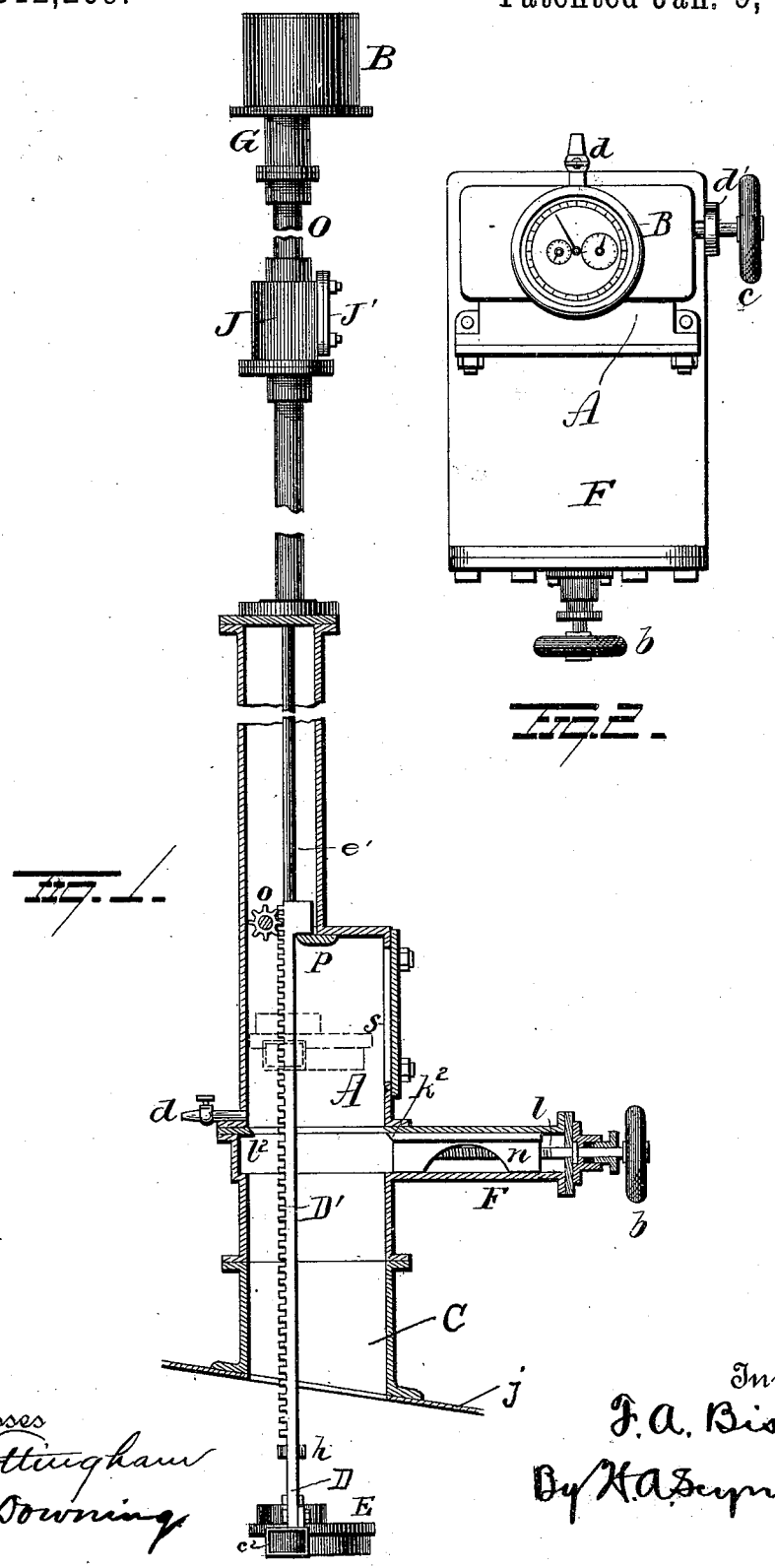

F. A. BISHOP.
SHIP'S LOG.

No. 512,269. Patented Jan. 9, 1894.

5 Sheets—Sheet 5.

Witnesses
Inventor
F. A. Bishop
Attorney

UNITED STATES PATENT OFFICE.

FRANCIS A. BISHOP, OF SAN FRANCISCO, CALIFORNIA.

SHIP'S LOG.

SPECIFICATION forming part of Letters Patent No. 512,269, dated January 9, 1894.

Application filed June 26, 1891. Serial No. 397,626. (No model.)

*To all whom it may concern:*

Be it known that I, FRANCIS A. BISHOP, of San Francisco, in the county of San Francisco and State of California, have invented certain new and useful Improvements in Ships' Logs; and I do hereby declare the following to be a full, clear, and exact description of the invention, such as will enable others skilled in the art to which it appertains to make and use the same.

My invention relates to an improvement in ship logs, and more particularly to an improvement in the connected apparatus for raising, lowering and registering the revolutions of the log, the object being to provide a device which may be readily attached, or removed while the vessel is still afloat for the purpose of cleaning, making repairs or of making an inspection of its condition; or for safety while in port, and to protect it against mud, slime and other harbor foulness while lying at port.

With these ends in view my invention consists in a log of improved construction, apparatus for raising and lowering this log, means for shutting out the water, cutting off the hanging sea weed or other débris, and draining out the water shut in the log case; means for retaining the log at any elevation, sealing the case water tight.

It consists further in novel registering mechanism and connected devices for communicating the motion of the log to the register whereby an exact record of the log is kept.

It still further consists in certain novel features of construction and combinations of parts which will be hereinafter described and pointed out in the claims.

Figure 10:
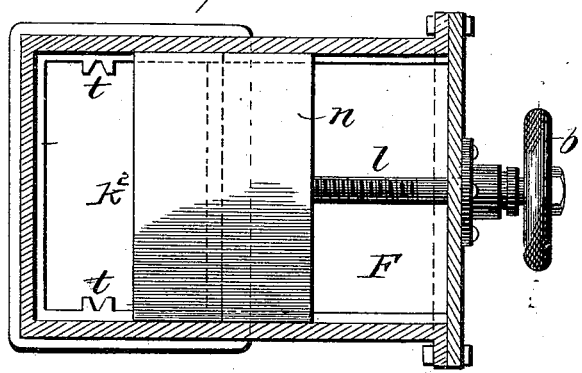
Figure 11:
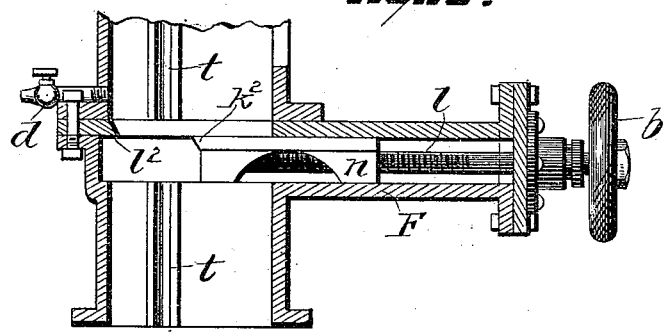
Figure 12:
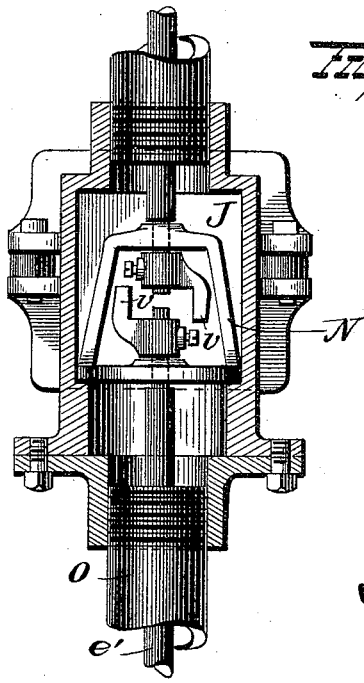

In the accompanying drawings, Figure 1 is a view in front elevation the casing being in section to show the interior. Fig. 2 is a plan view. Fig. 3 is a plan of the group of friction rollers for confining and steadying the vertical axle $e$ and $e'$ when extended. Fig. 4 is a side elevation of the case. Fig. 5 is a similar view of the tube O with the register in position on its upper end. Figs. 6 and 7 are enlarged views of the register mechanism. Fig. 8 is an enlarged plan of the log, with top removed. Fig. 9 is a vertical section. Fig. 10 is a plan view of the gate. Fig. 11 is a section of same, and Fig. 12 is an enlarged detail of a portion of tube O.

A represents the case of the apparatus, B the register and C the well. An opening is formed in the bottom $j$ of the vessel as shown in Fig. 1 and around this opening the well is secured. The case is secured on top of the well and in effect forms a continuation of the well and in these parts the water of course rises to its level.

D is the log frame, composed of side bars and cross bars, the side bars operating between guides $t, t$ on front and rear walls of the case. The side bars of the log frame, are provided on one side with rack teeth D' and a spindle $i$ journaled in the case is provided with pinions $o, o$, the teeth of which mesh with the teeth of the rack bars as shown in Fig, 1. The spindle is provided on its outer end with a hand wheel $c$ by means of which it is turned to raise and lower the frame as occasion may require; also is provided a toothed wheel $d^2$ on the spindle and a dog $d'$ for locking the spindle and consequently the log frame and log at any elevation.

The log E is removably secured to the lower end of the log frame by screws or other means as shown in Fig. 1 so that when the frame is lowered the log is some distance below the bottom of the vessel as shown in full lines. As it is desirable that there be a limit to the depression of the log, a stop $p$ is located in position to be struck by the upper cross bar of the log frame just before the upper ends of the racks pass beyond the pinions $o\, o$. The dotted lines in Fig. 1 indicate a convenient elevated position of the log when raised out of the water in harbor, for inspection, repairs or other purposes. It will be noticed that a hand hole $s$ is formed in the case at this point. Through this opening access is had at any time, to the log. A door $s'$ is provided for closing this opening, suitable means being provided for making it water tight when closed. Beneath the hand hole $s$, a gate chamber F is formed. This chamber extends laterally some distance and a gate $n$ is mounted in the chamber where it is capable of sliding, guides being provided to insure a perfect action of the gate as it is slid back and forth. Of course various means might be resorted to for operating this gate but I have found it convenient to employ a screw $l$ such as used in a certain class of slide valves. This screw has a hand wheel $b$ on its outer end by means of which it is manipulated. A stuffing box is arranged at the outer end of the chamber for the screw or stem $l$ to turn in. This gate is adapted to entirely shut the water out when closed and in order to cut off any sea weed or other substance which may be hanging from the log when it is drawn out of the water a pair of knives $l^2$ and $k^2$ on the case and gate respectively, are provided. These come together when the gate is closed and any material between them is severed. Assuming now that the log has been raised and the gate closed, the spigot or valve $d$ is opened and the water shut in the case above the gate is drawn off. Then if access to the log is desirable the door $s'$ may be removed or opened without danger or letting water out into the vessel. The appliances used for fastening this door may be any hitherto approved of, the main thing being obviously to fasten the door water tight.

The log which I have especially devised and which I prefer to employ is very simple and is shown enlarged and in detail in Figs. 8 and 9. It comprises essentially a circular chamber $x^2$ and a water way $c^2$ arranged tangentially with relation to chamber $x^2$ in open communication therewith and extending longitudinally with the vessel with both its forward and rear ends open for the free passage of the water therethrough. Fitted in the circular chamber, is the wheel or log $b^2$. This wheel or log is journaled in the center of the chamber $x^2$ and it has curved blades radially arranged around its hub. These blades project across the water way and as the water passes through the latter it revolves the wheel. The axle of the wheel is provided with a pinion $g^2$ and the teeth of this pinion engage the teeth of a larger wheel $a^2$ on the stem $i^2$ which connects with the registering machinery. A top $i^3$ is secured over the circular chamber of the log box and in it a bearing is formed for the upper end of the stem of the wheel or log $b^2$.

Tube O is secured to the upper end of the case A it being preferably made in two or more sections so as to run up as far as necessary according to the height of the deck where the register is placed. These sections are necessary for convenience of construction and erection; for locating bearings for the stems contained therein for lubrication and observation. The adjacent ends of the sections of the tube are provided with suitable flanges and the sections are secured together by bolting through these flanges or in any other convenient way. The extreme upper end of tube is also provided with a flange as shown in Figs. 6 and 7 and bolts or other fastenings are used at this point to couple the register to the tube. Through the tube O the stem $e$ $e'$ passes, the latter extending from the log to the register. The lower end of the stem is made in telescoping sections to admit of the log frame being raised and lowered without moving the upper end of the stem, and in order to cause these sections of the stem to rotate together they are provided with a feather and groove or other equivalent means to insure a communication of rotary motion from one section to the other. Also each tube section O is furnished with an independent stem section, suitable bearings being formed therein for the support of the stem. The outer ends of each stem section are provided with clutches $v, v$ their purpose being to impart the rotary motion from one stem section to the next and it will be seen that any cramping due from slight departure from line will be obviated through the action of these clutches. The lower end of section $e$ is stepped at $h$ in the lower end of the log frame, and beneath this step the end of stem section $e$ and the adjacent end of stem $i^2$ are provided with clutches $v, v$ as at the other ends of the sections and for the same purpose. As this portion goes into the water, it is inclosed by a metal or glass tube R. Also to furnish protection for that portion of section $e$ which enters the water, a shield T is secured to the log frame in front of it. Anti-friction rollers or bearings $a$ are stationed at the upper end of the log frame to bear on the stem as it revolves, to reduce the friction to a minimum.

The upper section of tube O is provided with a hand hole J as shown in Figs. 1, 5 and 12. The neck of the lower member when in place comes flush with the bottom of the hand hole, its top being slightly recessed so that it may receive the base of the double step N. This step has a circular base and two narrow and opposite sides inclining toward each other at the top. A bar across the top and parallel with the base connects them. Both base and bar are bored central and vertical to receive and form journals for the ends of the stem sections which meet at that point. The hand hole is kept closed by a door J' held in place by bolts or similar means.

The register is indicated by the letter B as previously mentioned. Of course any approved register might be employed but as I have devised one especially for the purpose I will now proceed to describe it in detail.

B' represents the base of the register, and G a hollow tube integral with the lower face of the base and adapted to sit on and be secured to the upper end of the upper section of tube O. Through this tube a stem $f$ corresponding to the stems $e, e'$ and $i^2$ extends, it being provided at its lower end with a clutch $v$ and its upper end protruding through a bearing $l$ on top of the base. This upper end has a small pinion $g$ secured thereon through which motion of the stem is communicated to the entire chain of gearing in the register as follows: Two upright spindles 5 and 6 are revolubly supported in the base B' at their lower ends and in the overhanging arm 7 at their upper ends. Spindle 5 is provided with a large wheel 8 the teeth of which mesh with the teeth of pinion $g$ and on this spindle a single tooth 9 is secured in position to engage a tooth of a large wheel 10 on spindle 6 and move the latter the space of one tooth each time it makes a revolution. Spindle 6 has a worm 11 formed at or near its upper end, and this worm engages the teeth of a worm wheel 12 on the horizontal arbor $m$. This arbor is journaled in brackets 14, 14, and is provided with a friction wheel P. Over the horizontal arbor $m$ is revolubly supported on the upper end of upright 16 a friction disk H. This disk receives motion from the friction wheel and the speed at which the disk is moved is regulated by mechanism which will be hereinafter described. The edge diametrically opposite the points of contact of the friction wheel P is supported by an idle wheel $h^2$ and contact of the disk with the wheel is insured by the pressure roller $k$.

The dial plate 17 is supported on posts 18, 18. Several dials are formed on this plate and dial hands for indicating on these dials, are provided. A large toothed wheel 19 is secured to the hub of the friction disk H and one of the hands is secured on the upper end of the pivot $w$ of this disk. There are two other arbors 20 and 21 one for each of the other hands and arbor 20 has a large toothed wheel $20^a$ the teeth of which engage teeth on the axle of disk H and arbor 21 has a small wheel 22 thereon the teeth of which engage the teeth on the large wheel 19. So it will be seen from the foregoing that motion is communicated from disk H to all three of the dial hands the speed of each being regulated by the size of wheels, one hand making a complete revolution over its dial every ten miles, another every hundred miles and the third every thousand miles.

To return now to the regulating mechanism. Incorporated in the register train is a novel device for accelerating or retarding the motion of the dial pointers while the measuring wheel is moving at its normal velocity, which is equivalent to changing the number of teeth in the gearing. This offers a delicate and ready adjustment which cannot be made in a train of toothed wheels without much trouble and expense. To illustrate its operation; let it be assumed that the rate of the measuring wheel has been determined by actual trial and the teeth in the train changed to their limit, but not to the accuracy required. Now if the time in which the vessel passes over a measured mile or any known distance be observed, and the register indicate a distance in the same time, but either greater or less than the real one. Then if the distance which the pointers show be less than the truth, the adjusting index must be changed so that the pointer speed may be increased. On the other hand, if the pointers indicate greater than the truth, the index must be changed so that the pointer speed may be diminished. Hence, by the method devised the differential will be obtained by simple movement of an index. In this way the master of a vessel in leaving a harbor and passing over distances accurately known can easily test his log, aided by tables showing the increments of increase or decrease for each point on the adjuster dial.

A sleeve 23 is mounted on shaft $m$ and rendered capable of sliding thereon by means of a feather. The exterior of said sleeve is formed into a circular rack as shown. Under this rack and engaging with it is the toothed wheel $q$. Its axle $z$ is supported by bridges 24, 24 which are set at right angles to the rack.

The outer end of axle $z$ is provided with a knob $u$ for rotating it, and fixed to knob $u$ is an index which moves over the adjuster dial $r$.

By revolving wheel $q$ in either direction the friction wheel P will advance or retreat along the arbor $m$. The wheel $q$ keeps such position as may be fixed upon, owing; first, to the slight rubbing between the index and the dial and tightened journals; and second, because the teeth of the rack parallel those of the wheel.

If at a point, say, about midway on the semi-diameter, one revolution of the friction wheel causes exactly one revolution of the disk, this point will be identical with zero on the adjuster dial $r$ and the first fixed point of departure for its index. Any lateral movement therefore of the friction wheel toward the center of the disk will increase the speed of the disk, while a movement in the contrary direction will retard it.

The entire register mechanism is surmounted by a case 25 which is screwed or otherwise secured in place. This case has a glass top through which to see the hands on the dial.

Having fully described my invention, what I claim as new, and desire to secure by Letters Patent, is—

1. The combination with a suitable case, of a ship's log adapted to be raised and lowered in the case, and a gate for shutting off the water beneath the log when the latter is raised.

2. The combination with a case and a ship's log capable of being raised and lowered therein, of a gate for shutting off the water below the log when the latter is raised and knives connected with the gate and case for severing sea weed or other material between them, substantially as set forth.

3. The combination with a casing having a transverse gate-way formed therein, and a gate adapted to be moved in and out on the gateway to form a temporary bottom in the casing at this point, of a rotating ship's log capable of being drawn up above the gate, substantially as set forth.

4. The combination with a casing, and a ship's log constructed to be raised and lowered in the casing, of a gate located in position to form a temporary bottom in the casing, and a discharge cock or opening above the gate for discharging water confined above the gate when the latter is closed, substantially as set forth.

5. The combination with a case, and a ship's log adapted to be raised and lowered in the case, of a shut off valve adapted to shut off the water beneath the log when the latter is raised, a valve for drawing off the water shut in the case above the gate, said case provided with a hand hole, and a door for opening and closing this hand hole, substantially as set forth.

6. The combination with a case, and a tube secured thereto of a ship's log, a register, an extensible stem extending from the log to the register, and anti-friction bearings or wheels between which the stem rotates, substantially as set forth.

7. The combination with a friction disk, and an arbor, of a friction wheel having a rack attached thereto, a regulator for shifting the rack and friction wheel, said regulator comprising a spindle a toothed wheel thereon, and a dial and pointer, substantially as set forth.

8. The combination with a base plate, a standard, and a friction disk revolubly supported on upper end of standard, of a friction wheel adapted to engage the disk, a cylindrical rack connected with the friction wheel, means for shifting the rack gearing for actuating the friction wheel, a dial, pointers and gearing for communicating motion from the disk to the several pointers, substantially as set forth.

9. The combination with a rotary friction disk, pointers and gearing extending from the disk to the pointers, of a friction wheel having a cylindrical rack connected therewith, a spindle having a pinion thereon the teeth of which engage the teeth of the rack, means on the said spindle whereby it is turned to set the friction wheel relative to the center of the disk, and suitable gearing for driving the friction wheel, substantially as set forth.

In testimony whereof I have signed this specification in the presence of two subscribing witnesses.

FRANCIS A. BISHOP.

Witnesses:
NOBLE E. PIERCE,
JOHN WINSLOW.